INVENTORS
DAVID E. DELL'AGNESE
TOWNSEND TINKER
BY
Morsell & Morsell
ATTORNEYS

April 23, 1968 D. E. DELL'AGNESE ET AL 3,379,424
SCRAP METAL PREHEATERS
Filed July 5, 1966 4 Sheets-Sheet 3

INVENTORS
DAVID E. DELL'AGNESE
TOWNSEND TINKER
BY

Morsell + Morsell
ATTORNEYS

United States Patent Office 3,379,424
Patented Apr. 23, 1968

3,379,424
SCRAP METAL PREHEATERS
David E. Dell'Agnese, Port Washington, Wis., and Townsend Tinker, Easton, Md., assignors to Modern Equipment Company, Port Washington, Wis., a corporation of Wisconsin
Continuation-in-part of application Ser. No. 538,391, Mar. 29, 1966. This application July 5, 1966, Ser. No. 562,678
10 Claims. (Cl. 263—7)

This invention relates to improvements in scrap metal preheaters, and is a continuation-in-part of application Ser. No. 538,391, filed Mar. 29, 1966.

In the melting of iron or other metal scrap in an electric furnace it is advantageous to preheat said scrap by means of a preheater using low-cost gas in order to speed and facilitate the job of said electric furnace which is relatively expensive to operate. By such preheating it is possible to obtain greatly increased production without enlarging the capacity of the electric furnace. Moreover, by preheating the metal scrap before it is introduced into the furnace the moisture content of said scrap is removed, thus minimizing the possibility of an explosion and, additionally, many of the impurities in the scrap are melted out. Unfortunately, however, conventional gas preheaters have several shortcomings and are not entirely satisfactory for their intended purpose.

One serious shortcoming of conventional gas preheaters is that they employ an excessive amount of air in the burners, in addition to that required for combustion, and the oxygen in said excess air tends to oxidize the scrap metal and results in undesirable rust or scale on the charge. In addition, the present practice is to preheat the scrap metal to about 1800° F. prior to its introduction into the furnace, where it is melted at above 2400°, but with the preheaters presently available it has been found that the temperature of the upper portion of the charge, which is remote from the burners, may be only 1600° while the lower portion of said charge may reach 2000° or above.

A further disadvantage of conventional preheaters is that they are slow and inefficient in operation. With such conventional devices it ordinarily takes an hour and a half or two hours to preheat a charge of scrap metal, and in order to maintain a continuous operating cycle it is necessary to employ a large number of charge buckets and preheaters, which is not only inconvenient but is expensive.

With the above considerations in mind, one of the principal objects of the present invention is to provide a novel scrap preheater which is designed to simultaneously hold two or more charges of scrap metal, one above the other, so that while the lower charge is being preheated to the optimum desired temperature the hot gases passing upwardly therethrough also begin preheating the charge positioned thereabove. The result is that when said lower charge is deposited in the melting furnace and the upper charge descends to its position in the multi-stage preheater said upper charge will have already been partially heated, thereby reducing the time required to preheat said charge to the desired temperature and greatly increasing the speed and efficiency of the melting operation.

A further important object of the invention is to provide a novel scrap metal preheater which is designed to recirculate the relatively inert, exhausted combustion gases to temper the burner, in lieu of using excess air as in conventional preheaters, thereby minimizing oxidation of the scrap metal and producing charges which are relatively free of rust and corrosion.

A further object of the present invention is to provide an improved scrap metal preheater wherein the entire charge is more uniformly and thoroughly heated, and wherein said charge can be heated to a higher temperature more closely approaching the melting point of the metal than is possible with conventional preheaters.

Still further objects of the present invention are to provide an improved scrap metal preheater which is relatively inexpensive in design and construction, which is simple and reliable in operation, and which is otherwise particularly well adapted for its intended purposes.

While a structure embodying the above objects and advantages is disclosed and claimed in the aforementioned prior pending application Ser. No. 538,391, it is intended to include in this continuation-in-part application a modified form of said structure which comes within the scope of the invention.

More specifically, what is intended to be covered herein is a modified form of preheat furnace having upper and lower charge-containing compartments, as in the principal form of the invention, but which furnace is rotatable to shift the upper compartment 180° to the lowered position after the original lowermost charge has been deposited in the furnace, in lieu of the rigid furnace and cascading charge arrangement characterizing said prior structure, and which new, rotatable furnace design has certain manufacturing advantages.

A further important object of the present continuation-in-part application is to provide a preheat furnace having an air-cooled, jacketed wall construction which is less expensive and more durable than the refractory-lined wall structure employed in the principal form of the invention.

With the above and other objects in view, which other objects and advantages will become apparent hereinafter, the invention comprises the improved scrap metal preheater illustrated in the drawings and described in the following specification and also any and all modifications or variations thereof as may come within the spirit of said invention, and within the scope of the appended claims.

In the accompanying drawings, wherein there is illustrated one preferred embodiment of the invention and a modified form thereof, and wherein the same reference numerals designate the same parts in all of the views.

*Structure disclosed and claimed in application Ser. No. 538,391*

Figure 1:
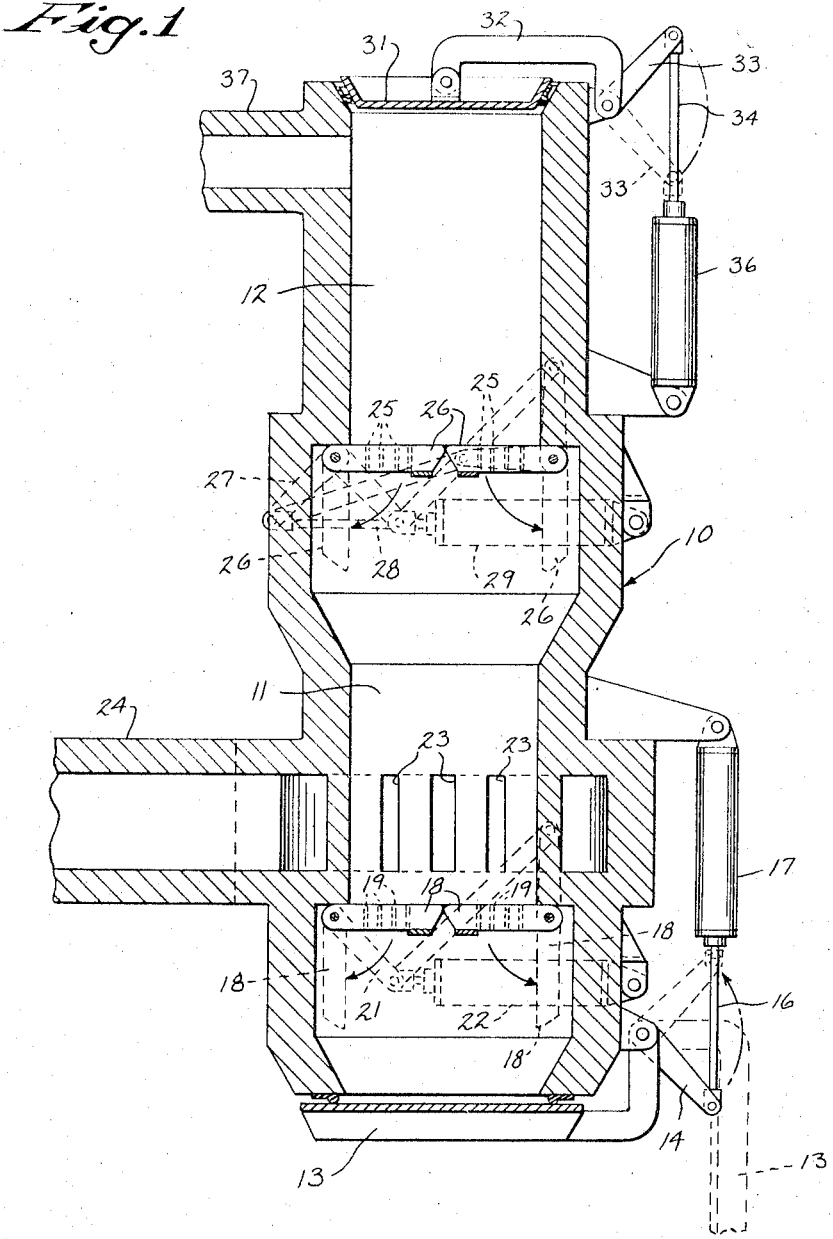
FIG. 1 is a vertical sectional view of the preheat furnace utilized in the present invention.

Referring now more particularly to FIG. 1 of the drawings, illustrated therein is the novel charge container or preheat furnace employed in the present invention and which is designated generally by the numeral 10. Said furnace is generally cylindrical in form and includes an upper section or compartment 12 and lower compartment 11, the lower end of said furnace having an opening therein and a hinged gas seal cover 13 which is pivotally associated with a hydraulic cylinder 17, extensible ram 16, and lever arm 14 which permits the controlled opening and closing of said cover. In lieu of said hydraulic members, and in lieu of the hydraulic gate and cover-actuating members hereinafter described, it is to be understood that mechanical or other suitable operating means could be employed, and the invention is by no means to be limited in this respect.

Intermediate the height of said furnace lower compartment 11 are a plurality of large, annularly-spaced gas inlet openings 23 which communicate with a burner supply pipe 24, the function of which will be hereinafter described, and mounted within the interior of said lower compartment immediately below said gas openings 23 are a pair of hinged, clam-shell type floor elements or gates 18. Said gates are pivotally associated with a hydraulic cylinder and ram unit 22 and levers 21 which permit the same to be swung downwardly to the open position illustrated in broken lines.

The upper section or compartment 12 of the preheat furnace 10 is generally similar in design to the lower compartment 11 and is provided with a pair of gates 26 having a multiplicity of openings 25 through which hot combustion gases may freely pass, as will be described, and which gates are pivotally associated with a hydraulic cylinder 29 and levers 28 permitting the same to be swung to the open, broken-line position shown. The upper portion of said compartment 12 has an exhaust gas duct 37 communicating therewith and a hinged sealing cover 31 is pivotally associated with a hydraulic cylinder 35, ram 34, and a lever 33 to permit the controlled opening and closing of said top cover. It will be noted that sharp wall angles and protuberances have been avoided in the interior of the preheat furnace in order to eliminate the possibility of scrap metal wedging or catching therein.

Figure 2:
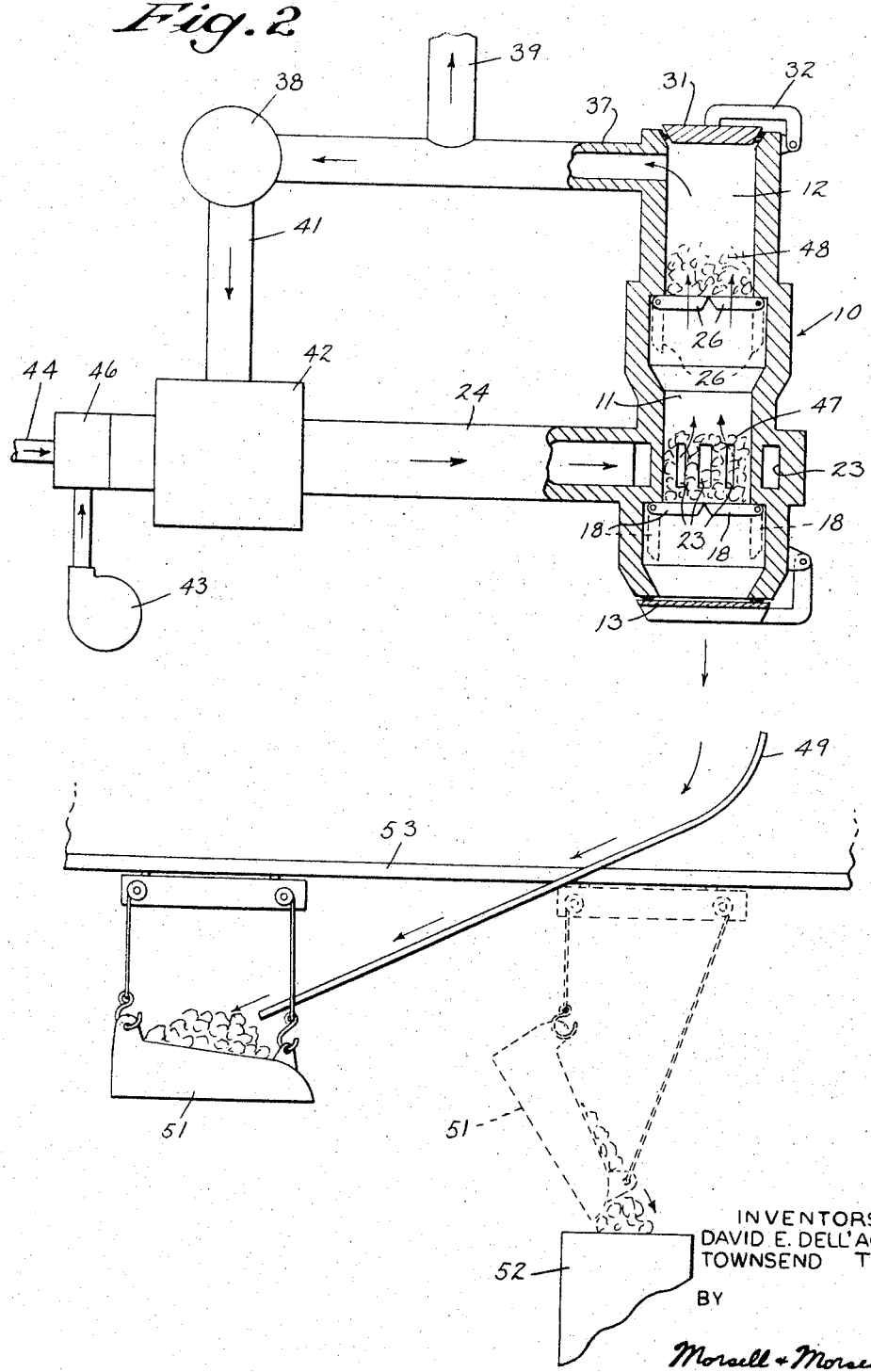
FIG. 2 is a diagrammatic view of the complete preheater system, with the novel charge-containing furnace shown in section.

Referring now to FIG. 2 of the drawing, which is a simplified diagrammatic showing, it will be seen that the aforementioned gas exhaust duct 37 communicating with the upper end of the furnace 10 leads to a recirculation blower 38, and intermediate the length of said duct 37 is a discharge stack 39 having a suitable check damper (not shown), said stack being designed to discharge a predetermined portion of the exhausted gases of combustion during operation, as will be described. Said recirculation blower 38 is provided with a conduit 41 which leads to a burner 46 and combustion chamber 42, there being a blower 43 associated therewith and a supply pipe 44 leading from a suitable source of natural gas or other inexpensive fuel. Said combustion burner communicates with the aforementioned conduit 24 leading into the lower portion of the preheat furnace 10.

In the use of the present invention, when it is desired to preheat a charge of iron or other metal scrap, the top cover 31 of the furnace 10 is swung to an open position and a first charge of scrap metal is deposited therein. During the initial loading operation the gates 26 in the furnace upper compartment 12 are in their open, broken-line position to permit the charge to fall downwardly into the lower compartment 11, and the gates 18 in said lower compartment are closed. After the first charge of scrap metal has been deposited in the furnace, which charge is designated by the numeral 47 in FIG. 2, the upper compartment gates 26 are pivoted to their closed position and a second charge of scrap metal is introduced through the open top of said furnace, said second charge 48 (FIG. 2) resting on said gates 26 and being positioned directly above the charge 47 in the lower compartment. The furnace top cover 31 is then closed and the unit is ready for operation. As will be hereinafter seen, the mounting of two charges in the preheat furnace in stacked relationship is one of the unique and advantageous features of the present invention.

The burner 46 is then actuated and the hot combustion gases are forced through the conduit 24 and into the lower portion of the furnace 10 through the annular openings 23, said hot gases flowing upwardly through the lower scrap charge 47 and functioning to heat the same. As hereinabove mentioned, in conventional preheaters the charge is heated to an average of about 1800° F., but the arrangement of the small capacity, nozzle-mixing burners in said prior units is such that the upper portion of the charge may be only 1600° while the lower portion is 2000° or above. In the present unit, however, a much greater mass of hot gases is continuously passed through the metal charge, and there is more uniform heating of the entire charge. The result is that said charge is not only heated faster but it can be preheated to a higher temperature more closely approaching the melting point of the metal, thus speeding and facilitating the job of the relatively-expensive electric furnace and reducing the cost of the melting operation.

As the hot combustion gases flow upwardly through the lower charge 47 of scrap metal the temperature of said gases is reduced as heat is extracted therefrom and transferred to the metal, of course, but as said gases reach the upper charge 48 they are still sufficiently hot to begin preheating said cold upper charge. When the gases pass completely through the upper charge 48 they are cooled still further and are drawn outwardly through the duct 37, a portion of said gases being directed through the exhaust stack 39. In accordance with the present invention, however, a predetermined proportion of said spent comustion gases bypass said exhaust stack and are directed by the recirculation blower 38 back into the combustion chamber 42 of the burner. In the combustion chamber said cooler exhaust gases are intermixed with and temper the hot combustion gases and reduce the temperature of the latter to a desired, usable level.

As hereinabove mentioned, in conventional scrap preheaters a quantity of air in excess of that required for combustion is introduced into the burner combustion chamber to be mixed with and temper the combustion gases, and it has been found that the oxygen in said excess air tends to oxidize the scrap metal charge, thus producing undesirable rust and scale. With the present invention, however, the recirculated, spent exhaust gases are inert, of course, said gases consisting primarily of nitrogen and carbon dioxide, and the use of said inert gases in lieu of air to lower the temperature of the combustion gases reduces the oxidation of the charge to a minimum, and results in charges of superior quality. The elimination of rust and corrosion is further promoted by the relatively short preheating period required with the present invention, as will be described, and is one of the principal advantageous features of said invention.

When the lower scrap charge 47 has been heated to the optimum desired temperature the burner 46 is temporarily shut off and the gates 18 in the furnace lower compartment 11 and the bottom cover 13 are swung to their open positions, thus allowing said fully-heated charge to drop onto a trough 49 (FIG. 2) which is designed to direct said preheated scrap into a suitable crane or transport bucket 51. Said bucket then delivers the charge to the electric melting furnace 52 and deposits the same therein, as is shown in broken lines in FIG. 2.

After the preheated lower charge has been evacuated from the preheat furnace 10 as described, the lower compartment gates 18 and bottom cover 13 are again swung upwardly to their closed positions, and the gates 26 of the upper compartment 12 are opened, thus allowing the upper charge 48 to cascade or fall downwardly into the lower compartment 11, said upper charge having already been partially preheated during the preheating of the first charge, as described. Said upper gates 26 are then returned to their closed position and a new cold charge is deposited in the furnace upper compartment 12. The burner 46 is then reactivated to complete the preheating of the lower charge while the rising combustion gases simultaneously flow through the cold upper charge to begin preheating the same, and the entire cycle is repeated.

It has been found that with the novel design of the multi-stage preheat furnace 10 characterizing the present invention, wherein one scrap charge is partially preheated at the same time another charge is being heated to the optimum temperature, a supply of fully preheated scrap metal is ready for delivery to the electric melting furnace every seven or eight minutes, in lieu of the hour and a half or two hour period required with inefficient conventional preheaters.

In the preferred form of the present invention the opening and closing of the furnace gates and cover members, and the discharge of the preheated scrap from said furnace, are automatically timed and synchronized, thus eliminating the necessity for a human operator and automatically providing fully pre-heated charges at regular predetermined intervals. In addition, in lieu of a preheat furnace having two compartments, as in the illustrated form of the invention, it is contemplated that it might be advantageous in some installations to employ three or more stacked charge-holding compartments, and the invention is not to be limited in this respect.

From the foregoing detailed description it will be seen that the present invention provides a new and improved scrap metal preheater having several important advantages over the preheaters heretofore used. With the present invention two or more charges of scrap metal can be simultaneously carried in the preheater, one above the other, so that as the lower charge is being preheated to the optimum desired temperature the rising gases of combustion also function to begin preheating the charge or charges thereabove. The result is that when the lower scrap charge is deposited in the electric melting furnace and the charge thereabove descends to its position in the preheater the latter charge will have already been partially preheated, thereby greatly reducing the time required to fully preheat said charge.

Another important advantage obtained with the present invention is that by recirculating the relatively inert exhaust gases to temper the burner, in lieu of using excess air as in conventional pre-heaters, there is a minimum of oxidation of the scrap metal charge and said charge is relatively free of rust or scale. Moreover, with the present invention because the entire scrap charge is heated more uniformly it has been found that it can be heated to a higher temperature more closely approaching the melting point of the metal than in conventional preheaters, which further increases the efficiency and economy of the melting operation.

*Structure of present continuation-in-part application*

Figure 3:
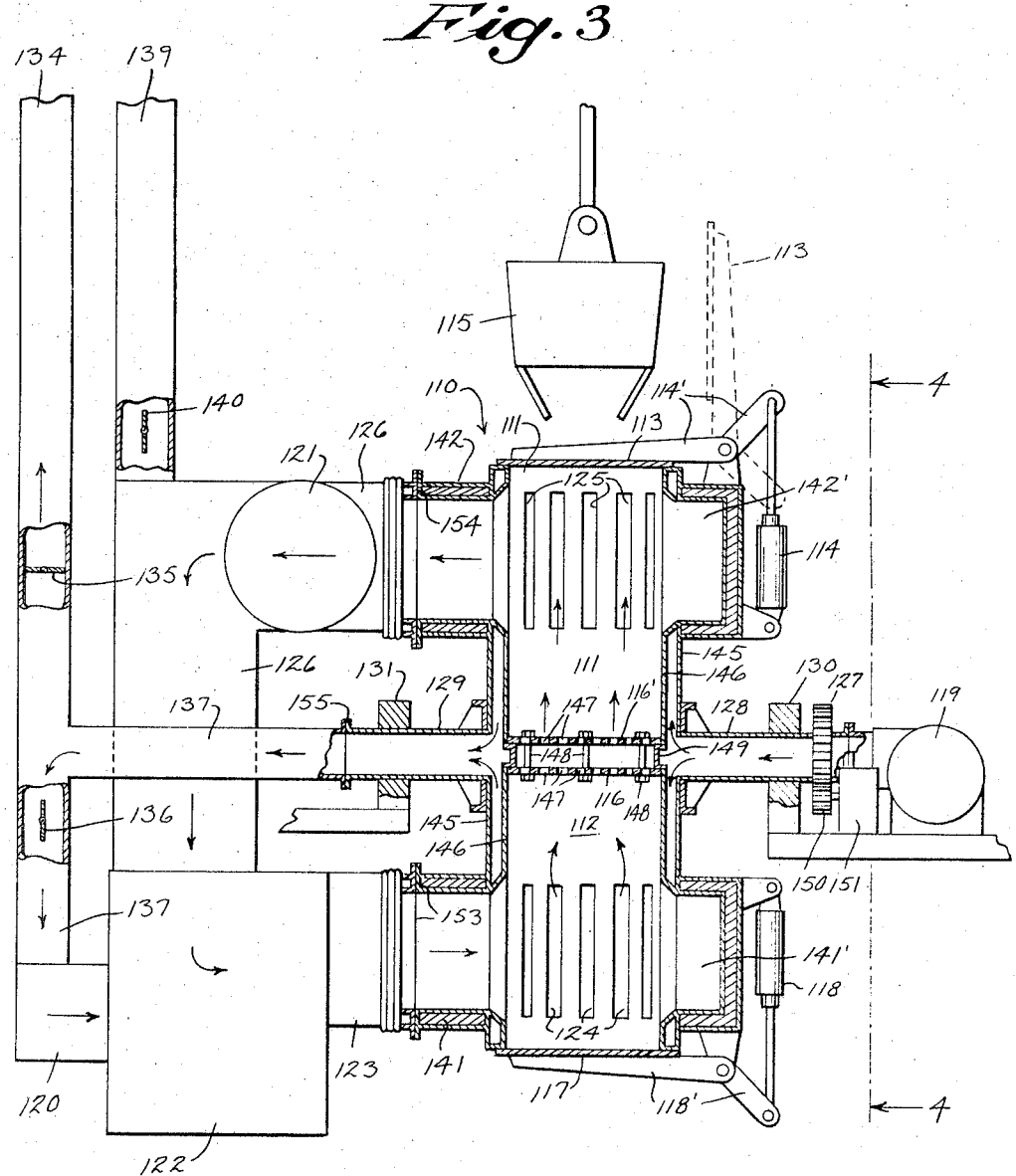
FIG. 3 is a side elevational and vertical sectional view of the modified furnace structure featured in the present continuation-in-part application.
Figure 4:
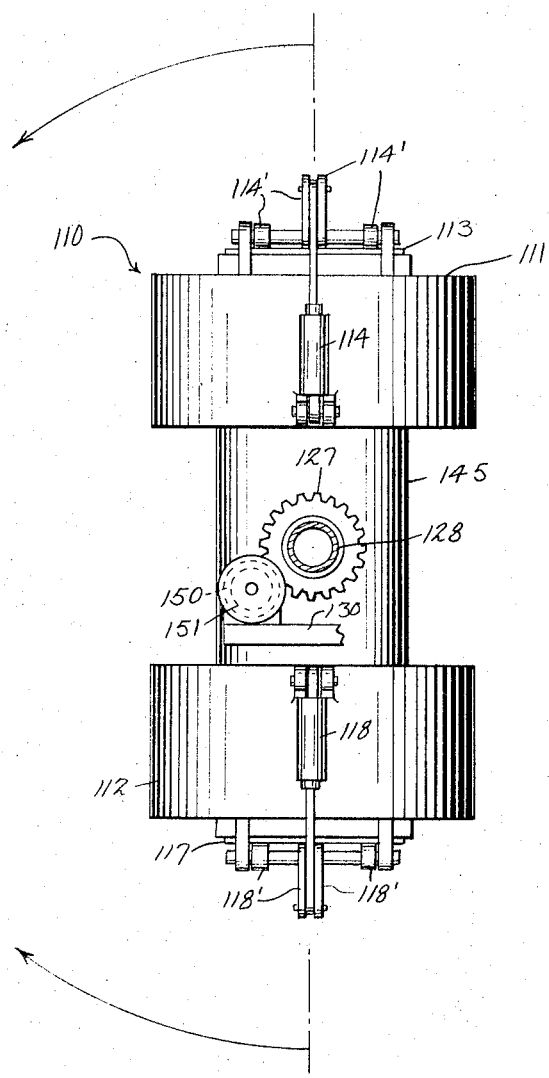
FIG. 4 is an end elevational view of said modified furnace looking inwardly along line 4—4 of FIG. 3.

With reference now to FIGS. 3 and 4, illustrated therein is the modified form of the invention which is the subject matter of the present continuation-in-part application.

As best appears in FIG. 3, the modified preheat furnace 110 is cylindrical in form, including a first charge-holding compartment 111 and a second compartment 112, and a pair of coaxial hollow trunnions 128 and 129 project from the sides of said furnace intermediate its height. Said trunnions are rotatably mounted in suitable support members 130, 131, and the entire furnace 110 is adapted to be rotated 180° on said trunnions (FIG. 4) to bring the compartment 111 to a lowered position while shifting the compartment 112 to a position aligned thereabove, as will be described.

In lieu of the insulated refractory-lined wall utilized in the preheat furnace illustrated in FIGS. 1 and 2, the modified furnace 110 is provided with an outer jacket or wall 45 and an inner wall 46 spaced therefrom (FIG. 3) to provide an annular cavity surrounding the furnace body. Said walls are preferably formed of ¾"–1" thick stainless steel and the inner wall may be provided with suitable ribs, if desired. The hollow trunnion 128 communicates with the annular space provided between said walls 45, 46, as shown, and is connected to a blower 119 adapted to blow outside air through said hollow trunnion and into said wall space to continuously cool the furnace wall during operation. A portion of the cooling air is directed upwardly, to circulate around the charge compartment 111, and an equal portion is diverted downwardly to cool the wall of the lower charge compartment 112. After flowing completely around the furnace when it is in operation the temperature of said air is ordinarily raised to about 400° F. and as said air flows outwardly through the opposite hollow trunnion 129 it is directed through duct 137 to the furnace burner 120, where it is efficiently utilized for combustion by the burner, as will be described. The oxygen in said air is consumed in the burner, of course, thereby eliminating the danger of the combustion gases oxidizing and rusting the scrap charges.

With reference still to FIG. 3 of the drawings, the charge compartment 111 is provided with a cover 113 which is pivotal to the open, broken-line position by a hydraulic ram unit 114 and connected linkage 114', or other suitable means, and the compartment 112 is provided with a similar cover 117 operable by means of a power unit 118 and linkage 118'.

Mounted within and intermediate the height of the furnace 110 are a pair of spaced, parallel floor discs or plates 116, 116' about two inches thick and having a plurality of registering apertures 147 therethrough through which hot combustion gases may pass, approximately 50% of the area of said plates preferably being open. Said plates 116, 116' are secured in spaced relation by spiders or pins 148 welded therebetween, and are rigidly mounted in clamped relation on an air-cooled, inwardly-projecting annular shelf 149 formed on the furnace interior. Unlike the hydraulically-actuated pivotal gate members 18, 26 utilized in the furnace illustrated in FIGS. 1 and 2, said heavy-duty floor plates 116, 116' are fixed and are better able to withstand the shock and strain when charges of scrap metal are repeatedly dropped thereon. Moreover, when metal fatigue or other causes require the replacement of said floor unit, the pins 148 may be quickly burned out and said plates 116, 116' easily and inexpensively removed and replaced, thus eliminating the necessity for removing and installing a pair of relatively expensive, hydraulically-actuated pivotal gate units.

The burner 120 shown in FIG. 3 is similar in design and function to that employed in the principal form of the invention, including a combustion chamber 122, and the combustion gases are directed through duct 123 into an interconnected duct 141 which is a part of an annular ring 141' surrounding the lower portion of the furnace 110, said ring communicating with the spaced gas inlet slots 124. A similar annular ring 142' surrounds the opposite furnace compartment 111, communicating with the slotted openings 125 therein, and a duct 142 projects therefrom and is separably connected to duct 126 leading to the combustion chamber 122, the function of which will be hereinafter seen. The connections between said ducts 142 and 126 and between the lower ducts 141 and 123 are separable to permit said ducts to be moved apart an inch or two during the rotation of the furnace, as will be described. Preferably, accordion-type joints with sealing flanges 153, 154 are utilized, and a hydraulic ram or the like is provided for moving the ducts 123, 126 into and out of sealing engagement with the opposed ducts, although numerous types of joints could be used for this purpose and the invention is not to be limited in this respect.

In the use of the preheat furnace 110 the top cover 113 is first pivoted upwardly to its open, broken-line position and a charge of scrap metal carried in a portable container 115 or the like is deposited in the upper compartment 111, said charge falling downwardly onto the grate assembly 116, 116'. After the charge has been deposited in said upper compartment 111, the cover 113 is closed, the ducts 142, 126 and 141, 123 disconnected and separated, and the entire furnace 110 is rotated 180° about the axis formed by the trunnions 128, 129, thus bringing the compartment 112 to the uppermost position with the charge-containing compartment 111 aligned therebelow. As illustrated in FIG. 4 a suitable mechanism for rotating said furnace includes a motor 151 having a gear 150 on its drive shaft adapted to mesh with and rotatably drive a gear 127 fast on the trunnion 128. However, the particular means employed to rotate said container is not critical to the invention. After the furnace has been rotated as described the ducts 142 and 123 can be connected, as can the ducts 141, 126. A scrap metal charge is then deposited in said upper compartment 112, the cover 117 is closed, and the preheat furnace is ready for operation.

When the burner 120 is activated hot gases from the combustion chamber 122 are directed through the interconnected conduits 123, 142, and through the slotted openings 125 into the lower charge-containing compartment. Said hot gases flow upwardly through the charge, heating said charge as they pass therethrough, and as said gases rise above the charge they pass through the openings 147 in the plates 116, 116' and continue upwardly through the charge carried in the upper compartment 112. The temperature of said gases is reduced as they pass through the lower charge, of course, but when said gases reach the upper charge they are still sufficiently hot to begin preheating the same, as in the principal form of the invention.

As the gases pass through the upper charge they are cooled further, of course, and they are drawn outwardly by a recirculation blower 121 associated with the duct 126 and directed back into the combustion chamber 122, where they function to temper the hot gases of combustion therein. Said recirculated gases are inert and free of oxygen and will not rust or corrode the charge.

It will be seen that an exhaust duct 139 communicates with the gas duct 126, and an automatically-controlled valve 140 therein is designed to permit a predetermined quantity of gases to be exhausted through said duct 139 to the atmosphere during the operation of the furnace. By positioning said exhaust stack 139 on the discharge side of the recirculation fan 121 said fan pulls the gases through the system, rather than pushing them through, and the entire system is under negative pressure. The result is that any leakage in the duct connections, etc., will be inward rather than outward, which latter condition could be detrimental to the equipment as well as dangerous for people in the area.

When the charge in compartment 111 has been heated to the desired temperature the burner 120 and recirculation blower 121 are temporarily shut off by means of suitable controls. The bottom door 113 is then opened and the charge is allowed to drop into a suitable conveyor positioned below said charge compartment and is transported to the electric melting furnace (not shown). The ducts 126, 141 and 123, 142 are then disconnected and separated as described, and the entire preheat furnace 110 is rotated 180° to bring the empty compartment 111 to the top position, and with the partially preheated charge in the compartment 112 positioned therebelow, said charge dropping to rest on the door 117 during said rotation. A new, cold charge of scrap metal is then deposited in the upper compartment 111 and the door 113 closed. After the ducts 126, 142 and 123, 141 are connected, the burner 120 and blower 121 may be actuated to repeat the heating process until the lower charge has been heated to the desired temperature, the new charge thereabove being simultaneously partially preheated, of course.

During the shut-down and rotation of the present preheat furnace a valve 136 in the duct 137 leading to the burner is automatically closed by means of a suitable control and a valve 135 in an exhaust or diversion stack 134 is simultaneously opened, thus permitting the air from the blower 119 to continue circulating around the furnace shell to cool the same but preventing said air from being directed back into the burner when the latter is not in operation. It is necessary to continue cooling the furnace wall even when the heating operation is temporarily halted because the temperature of the charge in said furnace will have reached 1800° to 2000° F.

As will be seen from the foregoing detailed description, the present continuation-in-part application discloses a novel modified form of the invention illustrated in FIGS. 1 and 2 which is intended to perform the same function, and which has the same important advantages over conventional preheat furnaces. With the present invention, two charges of scrap metal can be simultaneously carried in the preheater, one above the other, so that as the lower charge is being preheated to an optimum desired temperature the rising gases of combustion also function to begin preheating the charge thereabove. The result is that when the lower scrap charge is deposited in the electric melting furnace and the charge thereabove is rotated to the lowered position said charge will already have been partially preheated, thereby promoting the efficiency of the unit and greatly reducing the time required to fully preheat said charge.

Another important advantage obtained with the present invention is that by recirculating the relatively inert exhaust gases to temper the burner, in lieu of using excess air as in conventional preheaters, there is a minimum of oxidation of the scrap metal charge and said charge is relatively free of rust or scale.

It is to be understood that while the preferred embodiments of the present invention have been illustrated and described herein, various modified forms thereof will undoubtedly occur to those skilled in this art, and it is intended to cover herein not only the illustrated forms of the invention but also any and all variations or modifications thereof as may come within the spirit of said invention, and within the scope of the following claims.

What we claim is:

1. A scrap metal preheater, comprising: a furnace having a first scrap metal-holding compartment and having a second scrap-holding compartment thereabove; means rotatably supporting said furnace whereby it can be rotated substantially 180°; gas inlet means detachably connected to said furnace and adapted to permit the introduction of combustion gases from a source into the lower portion of said furnace to preheat a scrap charge therein, said combustion gases flowing upwardly from said lower furnace portion to partially preheat a scrap charge in the compartment thereabove; means for discharging a fully preheated scrap charge from said lower compartment; and means for rotating said furnace to shift said empty compartment to an upper position to receive a new charge of scrap metal while shifting said second compartment to a position therebelow to receive the hot combustion gases from said source, said gases heating said lower scrap charge to a desired temperature and flowing upwardly therefrom to partially preheat a charge in said upper compartment.

2. The scrap metal preheater recited in claim 1 and having: a burner; a combustion chamber associated with said burner; an inlet duct leading from said combustion chamber communicating with the lower portion of said furnace, said combustion gases being directed into the furnace through said inlet duct; a discharge duct communicating with the upper portion of said furnace; fan means associated with said exhaust duct adapted to draw said combustion gases through the furnace; and duct means connecting said exhaust duct to said combustion chamber, whereby inert, exhausted gases from said furnace are directed into said combustion chamber to temper combustion gases therein.

3. The scrap metal preheater recited in claim 2 and wherein said furnace includes: means for automatically disconnecting said gas inlet and discharge ducts from the furnace to permit the rotation of said furnace, and for connecting said ducts thereto when said furnace has been rotated to the desired position.

4. The scrap metal preheater recited in claim 1 and wherein said furnace includes: a grill mounted between and defining said first and second scrap-containing compartments, said grill comprising a pair of rigid, spaced plates having openings therethrough through which said combustion gases can pass.

5. The scrap metal preheater recited in claim 2 and wherein said furnace includes: a pair of spaced wall members, the space between said walls forming an annular cavity surrounding said furnace; and means for introducing air into said annular cavity and circulating the same therearound to cool said wall members during operation of the furnace.

6. The scrap metal preheater recited in claim 5 and wherein: said furnace is rotatably mounted on a pair of hollow trunnions projecting from opposite sides thereof intermediate its height, said trunnions communicating with said annular wall cavity; and wherein said cooling air is introduced into said wall cavity through one of said hollow trunnions and exhausted through the other of said trunnions.

7. The scrap metal preheater recited in claim 6 and having: means for directing said exhausted air into said burner.

8. The scrap metal preheater recited in claim 7 having: an exhaust stack communicating with the trunnion through which said air is exhausted; and having valve means associated with said exhaust stack permitting said cooling air to be discharged to the atmosphere when said burner is not in operation.

9. The scrap metal preheater recited in claim 2 having: an exhaust duct communicating with said gas discharge duct; and valve means permitting a predetermined portion of said exhausted furnace gases to be discharged to the atmosphere during operation of the furnace.

10. The scrap metal preheater recited in claims 8 and 9 wherein said valve means are automatically actuated and controlled.

References Cited

UNITED STATES PATENTS

| | | | |
|---|---|---|---|
| 890,250 | 6/1908 | Thompson | 263—7 |
| 2,235,154 | 3/1941 | Jones | 263—32 X |

FREDERICK L. MATTESON, Jr., *Primary Examiner.*

J. J. CAMBY, *Assistant Examiner.*